O. R. EIDE.
PORTABLE TURN TABLE.
APPLICATION FILED MAY 29, 1916.

1,205,133.

Patented Nov. 14, 1916.

INVENTOR:
Ole R. Eide,
BY his ATTORNEY:
A. M. Carlsen.

UNITED STATES PATENT OFFICE.

OLE R. EIDE, OF ST. PAUL, MINNESOTA.

PORTABLE TURN-TABLE.

1,205,133.          Specification of Letters Patent.      Patented Nov. 14, 1916.

Application filed May 29, 1916. Serial No. 100,557.

*To all whom it may concern:*

Be it known that I, OLE R. EIDE, a subject of the King of Norway, who have declared my intention to become a citizen of the United States, residing at St. Paul, in the county of Ramsey and State of Minnesota, have invented a new and useful Portable Turn-Table, of which the following is a specification.

My invention relates to equipments for handling automobiles in garages, and the object is to provide a movable turn-table by which automobiles may be readily turned end for end so as to enter and leave the garage without running backward, and by which the automobile may also be moved laterally and in any desired direction while in the garage so as to get it into the desired place and position for repairing or keeping it.

Another object is to simplify and further improve the invention described in my U. S. Patent No. 1,185,640 issued on the sixth day of June, 1916.

Figure 1:
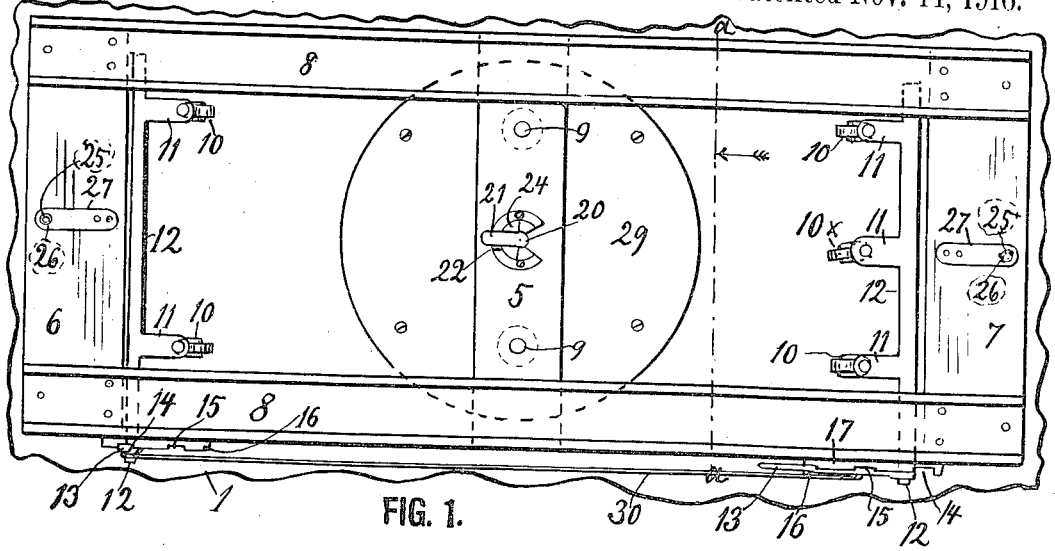
Figure 2:
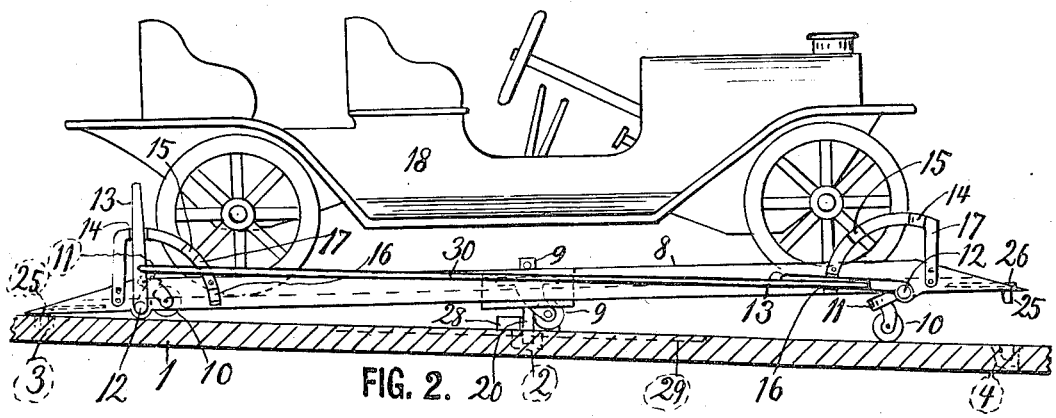
Figure 3:
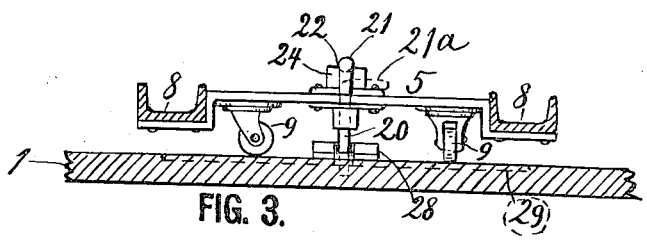
Figure 4:
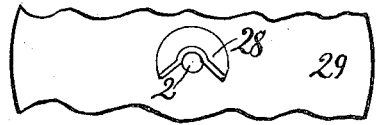

In the accompanying drawing;—Figure 1 is a top or plan view of the turn table resting upon a portion of a garage floor designed to support it during rotation. Fig. 2 is a side elevation of the turn table tilted with one end to the floor and an automobile standing upon it. Fig. 3 is a cross section on the line $a$—$a$ in Fig. 1. Fig. 4 is a plan view of a portion of the track plate and center piece in the floor upon which the table is rotated.

Referring to the drawing by reference numerals, 1 designates the garage floor, in which three bushings, 2, 3 and 4, are secured.

The turn table may be solid, but is preferably made up of three flat cross bars 5, 6, 7 and two longitudinal parallel grooved rails 8 for the guiding and supporting of the wheels of the automobile. The upwardly foldable end sections of the platform in the former patent above noted I dispense with by so arranging the entire platform that it may be tilted with either end to the floor and held in that position while the automobile enters or leaves it. To accomplish this I preferably offset the bar 5 upward between the rails 8 so as to get room underneath it for two comparatively large, strong casters 9, while each end of the platform is supported by smaller casters 10, swiveling in radial arms 11 of a rock shaft 12 which is journaled across the platform and at one end provided with a lever 13, which when released from the hand will spring into either one of three notches 14, 15, 16 in a segment 17 which is fixed to the platform; or the lever may carry a common pivoted latch (not shown) by which to engage the notches.

In Fig. 2 is shown how in operation the turn table may be tilted with the left hand end to the floor by placing the lever 13 at that end in the notch 14, thus raising the casters at that end, while at the right hand end the lever 13 is placed in the notch 16, thereby swinging the casters downward so as to raise that end of the platform and hold it raised while the automobile 18 is being run upon the platform and retained there by its brake. The table may then be brought to level position by placing both levers 13 in the notches 15. This brings the arms 11 to about horizontal position or so that the casters 10 hang slightly from the floor. The table may then be moved much easier on the two casters 9, or on them and the casters 10 at one end of the table than if all the casters bear heavily on the floor, as in my former patent. In this connection it may be stated that one or both of the rock shafts 12 may have only one caster, arranged near its middle, like caster $10^x$ in Fig. 1, so that the table may be moved on three casters, the automobile being so placed that it holds one end of the table down with sufficient pressure to hold the casters at the other end clear of the floor. When the table has reached its destination one end of it is lowered by the levers 13 and the automobile is run off of it.

For purpose of turning the table around in a certain place on the floor I provide it with a central sliding bolt 20 adapted to act as a turn pivot in the bushing 2 in the floor; said pivot bolt has its upper end provided with a horizontal handle 21 adapted to rest in a notch 22 in the top of a block 24 when the bolt is raised above the bushing in the floor, and when the bolt is in the bushing said handle occupies the lower position shown in dotted line $21^a$ in Fig. 3. The ends of the platform are also provided with vertically slidable bolts 25, having heads 26 to support them and limber flat springs 27 to prevent accidental escape of the bolts. When either end of the table is lowered on the floor in general, the spring 27 of that end will yield so the bolt 25 will allow the table to get close to the floor, but if the table has its center bolt in the bushing 2 and is turned in the proper direction the bolt 25 will enter the adjacent bushing, 3 or 4, and prevent accidental rotation of the table.

The guard piece 28 on the floor is to guide the bolt 20 directly over the bushing 2, said guard being fully described in my said former patent, except as to the feature that in the present case it is either secured to or made integral with a circular plate 29, which is secured to the floor, preferably flush therewith, and serves as a track for the casters 9, so they will not wear into the wooden floor. Of course this protection of the floor is also obtained if the track be annular and the guard plate 28 secured to the floor at the center of the track.

30 designates a rod which may connect the two levers 13 so that whenever one of them is swung upward the other swings downward automatically to the proper extent; when this rod is employed one of the sectors 17 may be dispensed with and the lever 13 at that end of the table may then be a mere rocker arm.

What I claim is:—

1. A portable turntable comprising a platform beveled at one end and having tracks for the wheels of a vehicle to move and stand on, a pair of casters supporting the platform near its middle and means for tilting the platform with the beveled end to and from the floor.

2. A portable turn table comprising a platform beveled at both ends and having a pair of grooved tracks, arranged to receive the wheels of a vehicle, casters supporting the platform at the middle so that either end of it may be tilted to the floor, other casters near each end of the platform, and means for raising said casters at either end of the platform and for lowering those at the other end so as to thereby tilt the platform and means for holding said end casters raised and lowered.

3. A portable turn table comprising a pair of main casters, a platform mounted on said casters so as to tilt with either end to the floor, a rock shaft journaled across each end of the platform, and casters carried by the rock shafts, so as to be swung to and from the floor when the shafts are partly rotated, means for rotating said shafts and means for holding them in any desired position.

4. A portable turn table comprising a pair of main casters, a platform mounted on said casters so as to tilt with either end to the floor, a rock shaft journaled across each end of the platform, and casters carried by the rock shaft, so as to be swung to and from the floor when the shafts are partly rotated, means for rotating said shafts and means for holding them in any desired position, and operative connection between the rocking means, whereby the casters at one end of the platform are automatically raised when those at the other end are lowered.

5. A portable turn table comprising a pair of main casters, a platform mounted on said casters so as to tilt with either end to the floor, a rock shaft journaled across each end of the platform, and casters carried by the rock shaft, so as to be swung to and from the floor when the shafts are partly rotated, means for rotating said shafts and means for holding them in any desired position, a circular track adapted to be secured in the floor of a garage or like place for the main casters to run on in rotating the turntable, a socket arranged in the center of the circular track, and a vertically slidable bolt carried by the middle portion of the platform and adapted to be lowered into the socket.

6. A portable turn table comprising a pair of main casters, a platform mounted on said casters so as to tilt with either end to the floor, a rock shaft journaled across each end of the platform, and casters carried by the rock shaft, so as to be swung to and from the floor when the shafts are partly rotated, means for rotating said shafts and means for holding them in any desired position, a circular track adapted to be secured in the floor of a garage or like place for the main casters to run on in rotating the turntable, a socket arranged in the center of the circular track, and a vertically slidable bolt carried by the middle portion of the platform and adapted to be lowered into the socket, other sockets adapted to be secured in the floor, and downwardly spring-pressed catches carried by the ends of the table for engaging in said other sockets or yield upward if pressed against the floor where there is no socket.

7. A portable turn table comprising a platform beveled at one end and having tracks for the wheels of a vehicle to move and stand on, a pair of casters supporting the platform near its middle, up and down movable casters under each end of the platform, a lever near one end of the platform and operative connection between said lever and the casters at the ends of the platform, so as to raise and lower either end of the platform by said casters and lever.

In testimony whereof I affix my signature.

OLE R. EIDE.